United States Patent Office 3,573,066
Patented Mar. 30, 1971

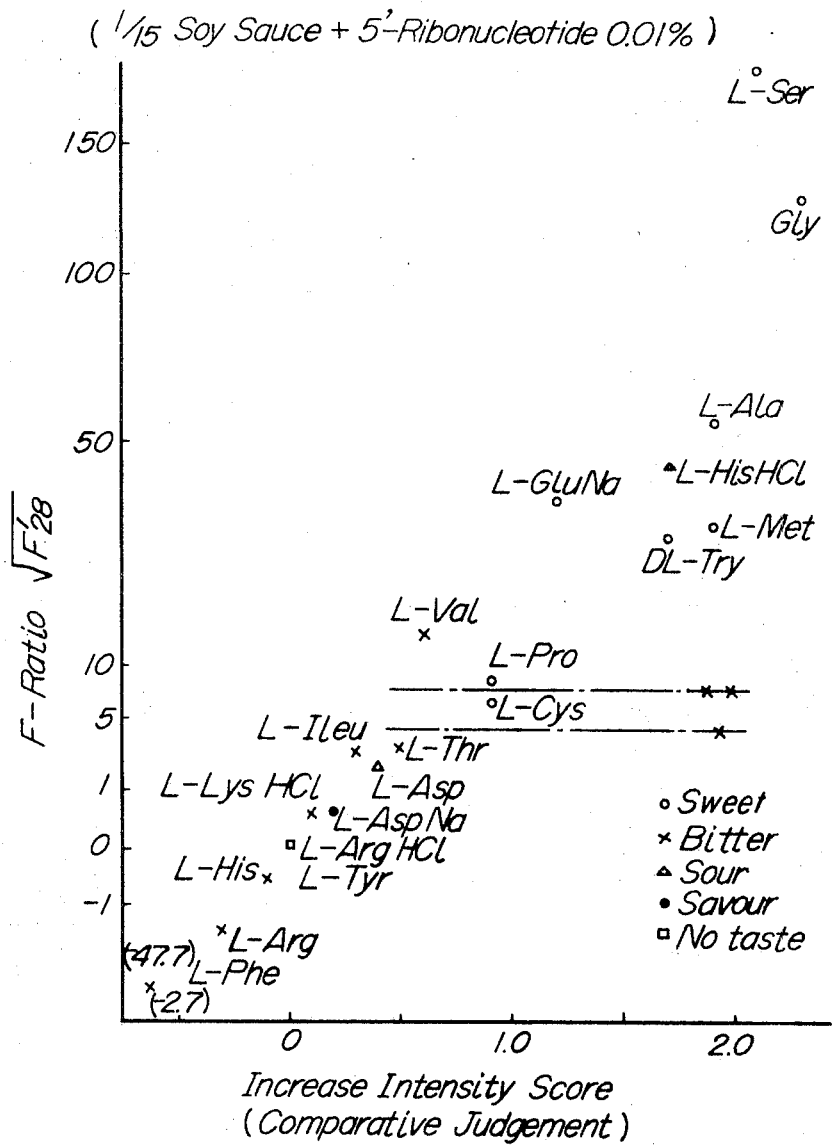

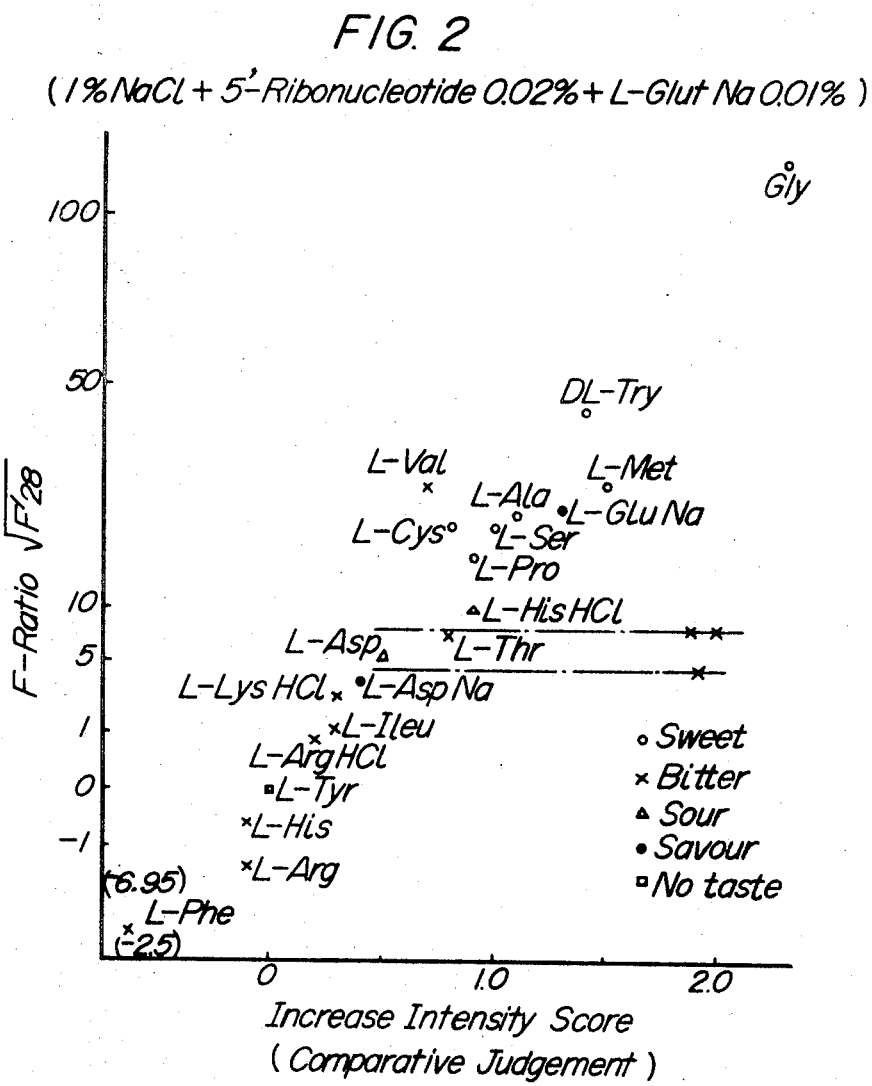

3,573,066
SEASONING COMPOSITION COMPRISING α-AMINO ACID, PALATABLE 5'-NUCLEOTIDE AND L-GLUTAMIC ACID AND FOOD BEING MANUFACTURED TO CONTAIN THE ABOVE THREE
Tamotsu Yokotsuka, Chiba-ken, and Nobuo Saito and Akira Okuhara, Noda-shi, and Teruo Tanaka, Matsudo-shi, Japan, assignors to Kikkoman Shoyu Co., Ltd., Noda-shi, Japan
Continuation of application Ser. No. 511,390, Dec. 3, 1965. This application June 16, 1969, Ser. No. 838,008
Claims priority, application Japan, Dec. 15, 1964, 41/70,186; July 27, 1965, 40/45,079; Oct. 8, 1965, 40/61,329
Int. Cl. A23l 1/22
U.S. Cl. 99—140           7 Claims

ABSTRACT OF THE DISCLOSURE

A seasoning composition containing L-glutamic acid or monosodium L-glutamate, a 5'-nucleotide and an α-amino acid.

This invention relates to a seasoning composition which comprises improving the palatable taste synergistically by adding selected α-amino acids to seasonings containing L-glutamic acid (or monosodium glutamate) and palatable 5' nucleotides, and food being manufactured to contain the above three.

It was found that when one or more selected α-amino acids are added to the medium which contains L-glutamic acid and 5'-nucleotides in a specific ratio, the palatable taste was significantly improved which is caused by the specific mutual accentuation among L-glutamic acid, 5'-nucleotides and the selected α-amino acids.

The α-amino acids selected in the present invention have no palatable taste themselves. However, when they are added to the medium in the coexistence of L-glutamic acid or its monosodium salt and palatable 5'-nucleotides in the ratio as described below, a distinctive improvement of palatable taste is recognized.

The synergism among L-glutamic acid (monosodium salt), 5'-nucleotides and the selected α-amino acids (or their salt) is different from that between monosodium L-glutamate and 5'-nucleotides.

The selected α-amino acids are glycine, L-serine, L-alanine, DL-tryptophane, L-histidine-HCl salt and L-methionine. These six kinds of α-amino acids have a significantly excellent taste increase action as compared with other amino acids as shown in FIGS. I and II. The amino acids employed are shown in Table A. The method of sensory test is entirely the same as in experiments. The amino acid composition of the soy sauce used in the FIGS. I and II, experiments and examples is denoted in Table B.

As for the palatable 5'-nucleotides, compounds obtained by decomposing ribonucleic acid with 5'-phosphodiesterase or by synthesizing, or natural substances such as small dried sardines, dried bonito and the like, are usable. Glutamic acid contained in the seasoning or food can be employed as L-glutamic acid.

Glycine has been used as food additive. However, its purpose is to increase sweetness and buffer action or to enrich the amino acid from the point of nutrition and further some action whose mechanism has not completely been clarified. L-serine has sweetness and a slight sourness and it has not been used as food additive. L-alanine is an amino acid with sweetness and has been chiefly employed for the purpose of the improvement of flavor of "sake" and "synthetic sake" and moreover buffer agents, medicines and the like. L-methionine is an essential amino acid having specific odor and a slight sweetness. Hitherto it has been used as a food additive for the purpose of the enrichment of amino acid from the point of nutrition and medicines (liver disease). L-histidine-HCl has sourness and hitherto it has been ony used as a food additive for enrichment of amino acid from the point of nutrition or for medicines. DL-tryptophane is an essential amino acid with a slight sweetness and it has been merely used as a food additive for the enrichment of amino acid from the point of nutrition or for medicines.

As the result of research on the effective use of the palatable 5'-nucleotides, the present inventors found that

TABLE A.—SAMPLES MEASURED

| Name of amino acid | Abbreviation | Molecular formula | Molecular weight |
|---|---|---|---|
| L-alanine | L-ala | $C_2H_7O_2N$ | 89.10 |
| L-arginine | L-arg | $C_6H_{14}O_2N_4$ | 174.21 |
| L-arginine monohydrochloride | L-arg HCl | $C_6H_{15}O_2N_4Cl$ | 210.67 |
| L-aspartic acid | L-asp | $C_4H_7O_4N$ | 133.11 |
| Monosodium L-aspartate | L-asp Na | $C_4H_6O_4NNa$ | 155.09 |
| L-cystine | L-cys | $C_6H_{12}O_4N_2S_2$ | 240.31 |
| Monosodium L-glutamate monohydrate | L-glu Na | $C_5H_8O_4NNa.H_2O$ | 187.13 |
| Glycine | Gly | $C_2H_5O_2N$ | 75.07 |
| L-histidine | L-his | $C_6H_9O_2N_3$ | 155.16 |
| L-histidine monohydrochloride monohydrate | L-his HCl | $C_6H_{10}O_2N_3Cl.H_2O$ | 209.63 |
| L-isoleucine | L-ileu | $C_6H_{13}O_2N$ | 131.17 |
| L-lysine monohydrochloride | L-lys HCl | $C_6H_{15}O_2N_2Cl$ | 182.65 |
| L-methionine | L-met | $C_5H_{11}O_2NS$ | 149.21 |
| L-phenylalanine | L-phe | $C_9H_{11}O_2N$ | 165.19 |
| L-proline | L-pro | $C_5H_9O_2N$ | 115.13 |
| L-serine | L-ser | $C_3H_7O_3N$ | 105.10 |
| L-threonine | L-thr | $C_4H_9O_3N$ | 119.12 |
| DL-tryptophane | DL-try | $C_{11}H_{12}O_2N_2$ | 204.22 |
| L-tyrosine | L-tyr | $C_9H_{11}O_3N$ | 181.20 |
| L-valine | L-val | $C_5H_{11}O_2N$ | 177.15 | the said α-amino acids significantly activate the palatable taste of the medium comprising both 5′-nucleotides and L-glutamic acid, which has not entirely been known. Then by utilizing this synergism, we invented novel seasonings and foods having an excellent taste.

TABLE B.—AMINO ACID COMPOSITION OF SOY SAUCE

| Amino acid: | Mg./100 ml. |
|---|---|
| Tryptophane | 0 |
| Lysine | 445.9 |
| Histidine | 69.8 |
| Ammonia | 202.7 |
| Arginine | 191.6 |
| Cysteic acid | 0 |
| Aspartic acid | 465.9 |
| Threonine | 250.1 |
| Serine | 331.0 |
| Glutamic acid | 1,008.9 |
| Proline | 328.0 |
| Glycine | 195.2 |
| Alanine | 391.9 |
| Cystine | 0 |
| Valine | 339.6 |
| Methionine | 111.9 |
| Isoleucine | 321.4 |
| Leucine | 485.4 |
| Tyrosine | 54.4 |

These effects mentioned above are concretely explained by the following experiments by the sensory test. Experiments were conducted in the sensory test room equipped with air conditioning and lighting of the Central Institute of Research, Kikkoman Shoyu Co., Ltd.

The panel of the sensory test consisted of 15 members and their discriminative faculty, validity of judgement and reliability were usually examined. The paired comparison was employed as a type of test, wherein comparison of two samples, the degree of the difference of the strength of palatable taste between both compared with control was measured by the scoring method.

Scores were decided depending upon the following standards.

| Score: | Description |
|---|---|
| 0 | No difference detected. |
| 1 | Very slight difference. |
| 2 | Slight difference. |
| 3 | Moderate difference. |
| 4 | Large difference. |
| 5 | Extremely large difference. |

The data was analyzed by the analysis of variance. An exmple was shown in the following.

| | Scores of each panel | Total | Mean score |
|---|---|---|---|
| Sample I Control | 1 0 1 1 2 1 1 2 2 1 1 0 1 −1 2 | 15 | 1.0 |

ANALYSIS OF VARIANCE TABLE

| | ss | df | ms | F |
|---|---|---|---|---|
| Among samples | 7.5 | 1 | 7.5 | **21.01 |
| Error | 10.0 | 28 | 0.357 | |

NOTE: *Significant at the 5% level $F_{28}^1$ (0.05) = 4.20; **Significant at the 1% level $F_{28}^1$ (0.01) = 7.64; — Not significant (Degree of freedom—$\phi_1=1$, $\phi_2=28$).

Mean score and F Ratio described in table was measured by the examination of the significant difference according to the foregoing procedure.

The following abbreviations were used in experiments and examples.

IMP: Disodium 5′-inosinate $7H_2O$.
GMP: Disodium 5′-guanosinate.
XMP: Disodium 5′-xanthocinate crystal.

The abbreviations of amino acids were the same as in Table A.

EXPERIMENT I

Synergism among three factors, i.e., various kinds of α-amino acids, palatable 5′-nucleotides and L-glutamic acid: (In Experiment I, 1% of sodium chloride solution was employed as a medium.)

EXPERIMENT I–1

Relation between various kinds of α-amino acids and sodium L-glutamate:
Synergism between respective gly, L-ala, L-ser, L-his-HCl, L-met, or DL-try and L-Glu-Na was not recognized as shown in Table 1 and Table 2. Simultaneously increase of palatable taste by the amino acid itself was not found at all.

TABLE 1

| Sample | I | II | III | IV | V | VI | Control |
|---|---|---|---|---|---|---|---|
| Medium | (1) | (1) | (1) | (1) | (1) | (1) | (1) |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 0.2 | 0.4 | 0.2 | 0 | 0 | 0.1 | — |
| F-ratio | — | — | — | — | — | — | — |

[1] 1% solution of salt.

TABLE 2

| Sample | I | II | III | IV | V | VI | Control |
|---|---|---|---|---|---|---|---|
| Medium | (1) | (1) | (1) | (1) | (1) | (1) | (1) |
| L-glu Na (percent) | 0.01 | 0.01 | 0.01 | 0.01 | 0.01 | 0.01 | 0.01 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 0 | 0.5 | 0.1 | 0.1 | 0.1 | 0.2 | — |
| F-ratio | — | * | — | — | — | — | — |

[1] 1% solution of salt.

EXPERIMENT I-2

Relation between various kinds of α-amino acids and the palatable 5'-nucleotides:

As shown in Table 1, Table 3-1, Table 3-2 and Table 3-3, synergism between respective gly, L-ala, L-ser, L-his-HCl, L-met and DL-try and the palatable 5'-nucleotides (in a single or mixture of two kinds of them) was not recognized.

TABLE 3-1

| Sample | I | II | III | IV | V | VI | Control |
|---|---|---|---|---|---|---|---|
| Medium | (1) | (1) | (1) | (1) | (1) | (1) | (1) |
| IMP (percent) | 0.01 | 0.01 | 0.01 | 0.01 | 0.01 | 0.01 | 0.01 |
| GMP (percent) | 0.01 | 0.01 | 0.01 | 0.01 | 0.01 | 0.01 | 0.01 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 0.6 | 0.6 | 0.3 | −0.1 | 0.2 | 0.1 | — |
| F-ratio | * | * | — | — | — | — | |

[1] 1% solution of salt.

TABLE 3-2

| Sample | I | II | III | IV | V | VI | Control |
|---|---|---|---|---|---|---|---|
| Medium | (1) | (1) | (1) | (1) | (1) | (1) | (1) |
| IMP (percent) | 0.02 | 0.02 | 0.02 | 0.02 | 0.02 | 0.02 | 0.02 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 0.5 | 0.5 | 0.2 | 0.1 | 0 | 0.1 | — |
| F-ratio | * | * | — | — | — | — | |

[1] 1% solution of salt.

TABLE 3-3

| Sample | I | II | III | IV | V | VI | Control |
|---|---|---|---|---|---|---|---|
| Medium | (1) | (1) | (1) | (1) | (1) | (1) | (1) |
| GMP (%) | 0.02 | 0.02 | 0.02 | 0.02 | 0.02 | 0.02 | 0.02 |
| Gly (percent) | 0.10 | — | — | — | — | — | — |
| L-Ala (percent) | — | 0.05 | — | — | — | — | — |
| L-Ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 0.6 | 0.5 | 0.3 | 0.2 | 0.1 | 0.2 | — |
| F-ratio | * | * | — | — | — | — | |

EXPERIMENT I-3

Relation between IMP and GMP.

Synergism between IMP and GMP was not recognized and mere addition effects were found as clarified in Table 4.

TABLE 4

| Sample | I | II | III | Control |
|---|---|---|---|---|
| Medium | (1) | (1) | (1) | (1) |
| IMP (percent) | 0.02 | — | 0.01 | — |
| GMP (percent) | — | 0.02 | 0.01 | — |
| Mean score | 0.5 | 1.2 | 0.9 | — |
| F-ratio | * | ** | ** | |

[1] 1% solution of salt.

EXPERIMENT I-4

Relation between sodium L-glutamate and the palatable 5'-nucleotides

Synergism between L-glu-Na and the palatable 5'-nucleotides was recognized at 1% level of significance from Table 5 as already publicized. In this case the effect was similar by use of single or admixed (2 kinds) palatable 5'-nucleotides.

TABLE 5

| Sample | I | Control | II | Control | III | Control | IV | Control |
|---|---|---|---|---|---|---|---|---|
| Medium | (1) | (1) | (1) | (1) | (1) | (1) | (1) | (1) |
| L-glu Na (percent) | 0.1 | — | 0.1 | — | 0.1 | — | 0.1 | — |
| IMP (percent) | — | — | 0.01 | 0.01 | 0.02 | 0.02 | — | — |
| GMP (percent) | — | — | 0.01 | 0.01 | — | — | 0.02 | 0.02 |
| Mean score | 3.0 | — | 3.9 | — | 3.7 | — | 4.0 | — |
| F-ratio | ** | | ** | | ** | | ** | |

[1] 1% solution of salt.

EXPERIMENT I-5

Relation among various kinds of α-amino acids, palatable 5'-nucleotide and sodium L-glutamate.

As clarified in Table 2, Table 6–1, Table 6–2 and Table 6–3, synergism among respective gly, L-ala, L-ser, L-his-HCl, L-met and DL-try, the palatable 5'-nucleotides (the effect was the same in a single or mixture of 2 kinds of them) and L-glu-Na was significant.

Namely the taste was not detected by singly adding gly, L-ala, L-ser, L-his-HCl. L-met or DL-try to 1% of sodium chloride solution in the amount of threshold or the less. Moreover these amino acids did not show synergism between the palatable 5'-nucleotides or L-glutamic acid.

However, they showed specific action in the mixture of the palatable 5'-nucleotides and L-glutamic acid. The synergism of three factors different from the action between the palatable 5'-nucleotides and L-glutamic acid was recognized.

adjusting the resulting solution to pH 5.0) was used as a medium].

General analysis of the soy sauce or the process soy sauce employed as a medium was as follows.

TABLE C

|  | NaCl | Total N | Formal N | Ammonia N | Reducing sugar | Alcohol | Glutamic acid |
|---|---|---|---|---|---|---|---|
| Soy sauce | 18.00 | 1.500 | 0.9 | 0.2 | 3.8 | 1.0 | 1.1 |
| Process soy sauce | 18.35 | 1.998 | 1.3 | 0.2 | 0 | 0 | 1.8 |

EXPERIMENT II-1

Relation among various kinds of α-amino acids, the palatable 5'-nucleotides and soy sauce.

As clarified in Table 7 and Table 8, the palatable taste was not increased by adding almost all amino acids except L-glutamic acid to soy sauce singly and even if detected, the effect of the addition was slight.

However, α-amino acids such as gly, L-ser, L-ala, L-met, L-his-HCl and DL-try, have a property to remarkably activate the taste of the palatable 5'-nucleotides in the presence of soy sauce (L-glutamic acid contained in soy sauce as shown in Table C).

In case of increase of the palatable taste by the addition of the palatable 5'-nucleotides to soy sauce, the specific action of increase of the palatable taste was shown

TABLE 6–1

| Sample | I | II | III | IV | V | VI | Control |
|---|---|---|---|---|---|---|---|
| Medium | (1) | (1) | (1) | (1) | (1) | (1) | (1) |
| L-glu Na (percent) | 0.01 | 0.01 | 0.01 | 0.01 | 0.01 | 0.01 | 0.01 |
| IMP (percent) | 0.01 | 0.01 | 0.01 | 0.01 | 0.01 | 0.01 | 0.01 |
| GMP (percent) | 0.01 | 0.01 | 0.01 | 0.01 | 0.01 | 0.01 | 0.01 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| Dl-try (percent) | — | — | — | — | — | 0.015 | — |
| Mean score | 2.3 | 1.1 | 1.0 | 0.9 | 1.5 | 1.4 | — |
| F-ratio | ** | ** | ** | ** | ** | ** | ** |

1 1% solution of salt.

TABLE 6–2

| Sample | I | II | III | IV | V | VI | Control |
|---|---|---|---|---|---|---|---|
| Medium | (1) | (1) | (1) | (1) | (1) | (1) | (1) |
| L-glu Na (percent) | 0.01 | 0.01 | 0.01 | 0.01 | 0.01 | 0.01 | 0.01 |
| IMP (percent) | 0.02 | 0.02 | 0.02 | 0.02 | 0.02 | 0.02 | 0.02 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean Score | 2.2 | 1.1 | 0.8 | 0.7 | 1.4 | 1.3 | — |
| F-ratio | ** | ** | ** | ** | ** | ** |  |

1 1% solution of salt.

TABLE 6–3

| Sample | 1 | II | III | IV | V | VI | Control |
|---|---|---|---|---|---|---|---|
| Medium | (1) | (1) | (1) | (1) | (1) | (1) | (1) |
| L-glu Na (percent) | 0.01 | 0.01 | 0.01 | 0.01 | 0.01 | 0.01 | 0.01 |
| GMP (percent) | 0.02 | 0.02 | 0.02 | 0.02 | 0.02 | 0.02 | 0.02 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 2.1 | 1.3 | 1.1 | 0.9 | 1.5 | 1.4 | — |
| F-ratio | ** | ** | ** | ** | ** | ** | ** |

1 1% solution of salt.

EXPERIMENT II

Synergism of three factors, i.e., various kinds of α-amino acids, the palatable nucleotides and soy sauce [In Experiment II. 15 times-diluted soy sauce or 15 times-diluted process soy sauce (obtained by hydrolyzing soy beans with hydrochloric acid, neutralizing with $Na_2CO_3$ and by further adding α-amino acids (the addition of one or two and more kinds of α-amino acids in the above-mentioned six kinds was effective) which have entirely been unknown as the palatable component. Therefore the synergism of the three factors, i.e., soy sauce, the palatable 5'-nucleotides and α-amino acids was significant.

TABLE 7

| Sample | I | II | III | IV | V | VI | Control |
|---|---|---|---|---|---|---|---|
| Medium | (1) | (1) | (1) | (1) | (1) | (1) | (1) |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his NCl (percent) | — | — | — | 0.00 | — | — | — |
| L-met (percent) | — | — | — | — | 0.03 | — | — |
| DL-try (percent) | — | — | — | — | — | 0.015 | — |
| Mean score | 0.5 | 0.7 | 0.7 | 0.3 | 0.4 | 0.4 | — |
| F-ratio | * | * | * | * | * | * | — |

¹ 1/15 diluted soy sauce.

TABLE 8-1

| Sample | I | II | III | IV | V | VI | Control |
|---|---|---|---|---|---|---|---|
| Medium | (1) | (1) | (1) | (1) | (1) | (1) | (1) |
| IMP (percent) | 0.01 | 0.01 | 0.01 | 0.10 | 0.01 | 0.01 | 0.01 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 2.2 | 1.6 | 1.5 | 1.6 | 1.6 | 1.5 | — |
| F-ratio | ** | ** | ** | ** | ** | ** | — |

¹ 1/15 diluted soy sauce.

TABLE 8-2

| Sample | I | II | III | IV | V | VI | Control |
|---|---|---|---|---|---|---|---|
| Medium | (1) | (1) | (1) | (1) | (1) | (1) | (1) |
| GMP (percent) | 0.01 | 0.01 | 0.01 | 0.01 | 0.01 | 0.01 | 0.01 |
| Gly (percent) | 0.10 | — | — | — | — | — | — |
| L-Ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 2.4 | 1.8 | 1.6 | 1.7 | 1.8 | 1.8 | — |
| F-ratio | ** | ** | ** | ** | ** | ** | — |

¹ 1/15 diluted soy sauce.

TABLE 8-3

| Sample | I | II | III | IV | V | VI | Control |
|---|---|---|---|---|---|---|---|
| Medium | (1) | (1) | (1) | (1) | (1) | (1) | (1) |
| IMP (percent) | 0.005 | 0.005 | 0.005 | 0.005 | 0.005 | 0.005 | 0.005 |
| GMP (percent) | 0.005 | 0.005 | 0.005 | 0.005 | 0.005 | 0.005 | 0.005 |
| Gly (percent) | 0.10 | — | — | — | — | — | — |
| L-Ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 2.4 | 1.9 | 2.1 | 1.7 | 1.9 | 1.7 | — |
| F-ratio | ** | ** | ** | ** | ** | ** | — |

¹ 1/15 diluted soy sauce.

TABLE 8-4

| Sample | I | II | III | IV | V | VI | Control |
|---|---|---|---|---|---|---|---|
| Medium | (1) | (1) | (1) | (1) | (1) | (1) | (1) |
| IMP (percent) | 0.005 | 0.005 | 0.005 | 0.005 | 0.005 | 0.005 | 0.005 |
| GMP (percent) | 0.005 | 0.005 | 0.005 | 0.005 | 0.005 | 0.005 | 0.005 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 2.2 | 1.5 | 1.6 | 1.5 | 1.6 | 1.5 | — |
| F-ratio | ** | ** | ** | ** | ** | ** | — |

¹ 1/15 diluted soy sauce.

TABLE 8-5

| Sample | I | II | III | IV | V | VI | Control |
|---|---|---|---|---|---|---|---|
| Medium | (1) | (1) | (1) | (1) | (1) | (1) | (1) |
| IMP (percent) | 0.005 | 0.005 | 0.005 | 0.005 | 0.005 | 0.005 | 0.005 |
| GMP (percent) | 0.005 | 0.005 | 0.005 | 0.005 | 0.005 | 0.005 | 0.005 |
| Gly (percent) | 0.05 | — | 0.05 | 0.04 | — | — | — |
| L-ala (percent) | 0.03 | — | — | — | 0.02 | — | — |
| L-ser (percent) | — | 0.05 | — | 0.04 | — | 0.04 | — |
| L-his HCl (percent) | — | 0.002 | — | — | 0.001 | — | — |
| L-met (percent) | — | — | 0.02 | — | — | 0.01 | — |
| DL-try (percent) | — | — | — | — | 0.005 | 0.005 | — |
| Mean score | 2.2 | 1.9 | 2.7 | 2.1 | 1.6 | 1.9 | — |
| F-ratio | ** | ** | ** | ** | ** | ** | — |

¹ 1/15 diluted soy sauce.

EXPERIMENT II-2

Relation among various kinds of α-amino acids, the palatable 5'-nucleotides and process soy sauce. Significant synergism is shown among the three components, i.e. (1) 5'-nucleotides, (2) L-glu or L-glu-Na and (3) α-amino acids such as Gly, L-ala, L-ser, L-his-HCl and DL-try. This is made clear by Table 9, Col. 11 of the specification.

The synergism of the three factors was signficant, as already mentioned in the concentration of threshold or less of the palatable 5'-nucleotides and α-amino acids.

Moreover the present invention was explained by the following example.

TABLE 9

| Sample | I | II | III | IV | V | VI | Control |
|---|---|---|---|---|---|---|---|
| Medium | (1) | (1) | (1) | (1) | (1) | (1) | (1) |
| IMP (percent) | 0.005 | 0.005 | 0.005 | 0.005 | 0.005 | 0.005 | 0.005 |
| GMP (percent) | 0.005 | 0.005 | 0.005 | 0.005 | 0.005 | 0.005 | 0.005 |
| Gly (percent) | 0.10 | — | — | — | — | — | — |
| L-ala (percent) | — | 0.05 | — | — | — | — | — |
| L-ser (percent) | — | — | 0.10 | — | — | — | — |
| L-his HCl (percent) | — | — | — | 0.004 | — | — | — |
| L-met (percent) | — | — | — | — | 0.03 | — | — |
| DL-try (percent) | — | — | — | — | — | 0.015 | — |
| Mean score | 1.7 | 1.3 | 1.4 | 1.2 | 1.3 | 1.2 | — |
| F-ratio | ** | ** | ** | ** | ** | ** | — |

[1] 1/15 diluted process soy sauce.

Example 1

Test of the taste of the glycine complex seasoning.

The complex seasoning consisting of glycine, the palatable 5'-nucleotides and L-glutamic acid was compared with the one of the palatable 5'-nucleotides and L-glutamic acid.

The ratio of composition of samples was as follows.

| | Percent | | | | |
|---|---|---|---|---|---|
| Sample | IMP/GMP=1 (disodium salt) | Sodium glutamate | Glycine | Lactose | Total |
| A | 9.92 | 59.51 | 29.75 | 0.82 | 100 |
| B | 10 | 90 | — | — | 100 |

The complex seasonings of Samples A and B which were homogeneously dispersed in the composition ratio, as mentioned above, were prepared equivalently at the current price. Lactose was added as an extending agent in order to balance the cost and it has been recognized in advance that it has no influence on the taste.

Method of investigation: The subject of the investigation was 20 households of the sensory test panel of the Kikkoman Shoyu Co., Ltd. employes. Samples A and B were used in various kinds of cooking and the better taste was described with round marks (o) in the table. The use of the samples was prescribed as follows.

(1) Stock was not made from dried bonito, tangle and the like but from the seasonings (Samples A and B) distributed.

(2) One bag of the sample (0.4 g.) was used by each person in a clear soup or miso soup.

(3) Samples A and B were used in hot water, soy sauce (miso) and ingredients as examples of dishes.

RESULT OF THE TASTE TEST

| Kind of dishes | A | B | $X_o^2$-value | Judgment |
|---|---|---|---|---|
| Clear soup (Sumashi) (Suimono). | 12 | 4 | 4 | Significant at 5% of level A is superior. |
| Miso soup | 13 | 5 | 3.56 | Significant at 1% of level A is superior. |
| Nimono (Boiling dishes); Tsuke shoyu (Raw soy sauce). | 8 | 3 | 2.27 | Significant at 20% of level A is superior. |
| Total | 33 | 12 | 9.8 | Significant at 1% of level A is superior. |

In each of the dishes, A was preferable. As the result of totalling all the kinds of dishes A was of significance with 1% of level. Accordingly A was recognized to be extremely tasty comparing with B when applied to any dishes.

Example 2

In case of the application to consomme. Significantly palatable new soup base was made by the addition of the seasoning obtained by homogeneously dispersing amino acids, the palatable 5'-nucleotides (disodium salt) and L-glutamic acid as shown in the following table to the base of consomme.

Comparing the soup containing the present seasoning with the one consisting of the same composition as mentioned above except non-adding α-amino acid, the former was better than the latter in use of any kinds of α-amino acids.

IN CASE OF THE APPLICATION TO CONSOMME

| Seasoning by the present invention | I | Control | II | III | IV | V | VI | Control |
|---|---|---|---|---|---|---|---|---|
| Gly (percent) | 62.5 | — | — | — | — | — | — | — |
| L-ala (percent) | — | — | 62.5 | — | — | — | — | — |
| L-ser (percent) | — | — | — | 77.0 | — | — | — | — |
| L-his-HCl (percent) | — | — | — | — | 11.8 | — | — | — |
| L-met (percent) | — | — | — | — | — | 50.0 | — | — |
| DL-try (percent) | — | — | — | — | — | — | 33.3 | — |
| IMP/GMP=1 (disodium salt) (percent) | 12.5 | 33.3 | 12.5 | 7.7 | 29.4 | 16.7 | 22.2 | 33.3 |
| L-glu-Na (percent) | 25.0 | 66.7 | 25.0 | 15.3 | 58.8 | 33.3 | 44.5 | 66.7 |
| Base of consomme (kg.) | 1 | 1 | 1 | 1 | 1 | 1 | 1 | 1 |
| Addition amount of the present seasoning (g.) | 100.8 | 37.8 | 56.0 | 91.0 | 23.8 | 42.0 | 31.5 | 21.0 |
| Mean score | 35 | — | 1.0 | 1.0 | 0.8 | 0.9 | 1.1 | — |
| F-ratio | ** | — | * | * | * | * | * | — |

EXAMPLE 3

In case of the application to miso soup.

Miso of good quality was made by adding the seasoning obtained by mixing α-amino acids with the palatable 5'-nucleotides (disodium salt) and dispersing homogeneously in the powdered misco as shown in the following table. The miso soup to which the present seasoning was added was much superior in use of any kinds of α-amino acids to the one having the same composition as mentioned above except non-adding of α-amino acid.

IN CASE OF THE APPLICATION TO MISO SOUP

| Seasoning by the present invention | I | Control | II | III | IV | V | VI | Control |
|---|---|---|---|---|---|---|---|---|
| Gly (percent) | 90.9 | — | — | — | — | — | — | — |
| L-ala (percent) | — | — | 90.9 | — | — | — | — | — |
| L-ser (percent) | — | — | — | 95.2 | — | — | — | — |
| L-his-HCl (percent) | — | — | — | — | 44.4 | — | — | — |
| L-met (percent) | — | — | — | — | — | 85.7 | — | — |
| DL-try (percent) | — | — | — | — | — | — | 75.0 | — |
| IMP/GMP=1 (disodium salt) (percent) | 9.1 | 100 | 9.1 | 4.8 | 55.6 | 14.3 | 25.0 | 100 |
| Powdered miso (kg.) | 1 | 1 | 1 | 1 | 1 | 1 | 1 | 1 |
| Addition amount of the present seasoning (g.) | 20.6 | 1.9 | 11.0 | 20.6 | 1.8 | 7.0 | 4.0 | 1.0 |
| Mean score | 1.7 | — | 1.8 | 1.1 | 1.0 | 1.3 | 1.5 | — |
| F-ratio | ** | | ** | ** | * | ** | ** | |

EXAMPLE 4

In case of the application to clear soup.

The seasoning prepared by mixing α-amino acids with the palatable 5'-nucleotides (disodium salt) and homogeneously dispersing as described in the following table was added to powdered soy sauce so as to make powdered soy sauce of excellent quality. Clear soup using the resulting soy sauce was significantly superior to the one made from the soy sauce consisting of the same composition as in the former except non-adding α-amino acids.

The seasoning prepared by mixing α-amino acids with L-glu-Na in the ratio mentioned below and homogeneously dispersing was added to the broth of dried bonito which naturally contains the palatable 5'-nucleotides. The resulting broth was much better in use of any α-amino acids than the one consisting of the same composition as in the former except non-adding α-amino acids.

IN CASE OF THE FOODS CONTAINING 5'-NUCLEOTIDES IN THE NATURAL SUBSTANCE

| Sample | I | Control | II | III | IV | V | VI | Control |
|---|---|---|---|---|---|---|---|---|
| Broth of dried bonito: | | | | | | | | |
| NaCl (percent) | 1 | 1 | 1 | 1 | 1 | 1 | 1 | 1 |
| IMP (free) (percent) | 0.01 | 0.01 | 0.13 | 0.013 | 0.013 | 0.013 | 0.013 | 0.013 |
| Gly | 0.10 | — | — | — | — | — | — | — |
| L-ala | — | — | 0.05 | — | — | — | — | — |
| L-ser | — | — | — | 0.10 | — | — | — | — |
| L-his-HCl (percent) | — | — | — | — | 0.004 | — | — | — |
| L-met (percent) | — | — | — | — | — | 0.03 | — | — |
| DL-try (percent) | — | — | — | — | — | — | 0.015 | — |
| L-glu-Na (percent) | 0.05 | 0.05 | 0.05 | 0.05 | 0.02 | 0.02 | 0.02 | 0.02 |
| Mean score | 2.2 | — | 2.1 | 2.2 | 1.8 | 1.9 | 1.9 | — |
| F-ratio | ** | | ** | ** | ** | ** | ** | |

The method of the present invention is applicable to the considerable large extent of the mixing ratio of

IN CASE OF THE APPLICATION TO CLEAR SOUP

| Seasoning by the present invention | I | Control | II | III | IV | V | VI | Control |
|---|---|---|---|---|---|---|---|---|
| Gly (percent) | 87.0 | — | — | — | — | — | — | — |
| L-ala (percent) | — | — | 90.9 | — | — | — | — | — |
| L-ser (percent) | — | — | — | 95.2 | — | — | — | — |
| L-his-HCl (percent) | — | — | — | — | 44.4 | — | — | — |
| L-met (percent) | — | — | — | — | — | 85.7 | — | — |
| DL-try (percent) | — | — | — | — | — | — | 75.0 | — |
| IMP/GMP=1 (disodium salt) (percent) | 13.0 | 100 | 9.1 | 4.8 | 55.6 | 14.3 | 25.0 | 100 |
| Powdered soy sauce (kg.) | 1 | 1 | 1 | 1 | 1 | 1 | 1 | 1 |
| Addition amount of the present seasoning (g) | 862.5 | 112.1 | 430.8 | 824.0 | 70.5 | 274.1 | 156.8 | 39.2 |
| Mean score | 1.0 | — | 2.1 | 1.9 | 1.1 | 1.4 | 1.6 | — |
| F-ratio | * | | ** | ** | * | ** | ** | |

EXAMPLE 5

In case of the addition of α-amino acids to foods containing 5'-nucleotides and L-glutamic acid in the natural substance.

The effect by adding α-amino acids to the broth of dried bonito and tangle which naturally contain L-glutamic acid and the palatable 5'-nucleotides was of significance.

α-amino acid to 5'-nucleotides in the presence of L-glutamic acid or monosodium glutamate. However, actually calculating to pure free form, the effective synergistic mixing ratio of each α-amino acid to 5'-nucleotides is as follows: glycine: 3–20, L-serine: 1–50, L-alanine: 2–20, L-histidine-HCl: 0.02–1, L-methionine: 0.05–20 and DL-tryptophane: 0.05–20. Moreover when the mixture of two IN CASE OF THE FOODS CONTAINING 5'-NUCLEOTIDES AND L-GLUTAMIC ACID IN THE NATURAL SUBSTANCE

| Sample | 1 | Control | II | III | IV | V | VI | Control |
|---|---|---|---|---|---|---|---|---|
| Broth of dried bonito and tangle: | | | | | | | | |
| NaCl (percent) | 1 | 1 | 1 | 1 | 1 | 1 | 1 | 1 |
| L-Glu-Na (percent) | 0.027 | 0.027 | 0.02 | 0.02 | 0.02 | 0.02 | 0.02 | 0.02 |
| IMP (free) (percent) | 0.01 | 0.01 | 0.013 | 0.013 | 0.013 | 0.013 | 0.013 | 0.013 |
| Gly (percent) | 0.10 | — | — | — | — | — | — | — |
| L-ala (percent) | — | — | 0.05 | — | — | — | — | — |
| L-ser (percent) | — | — | — | 0.10 | — | — | — | — |
| L-his-HCl (percent) | — | — | — | — | 0.004 | — | — | — |
| L-met (percent) | — | — | — | — | — | 0.03 | — | — |
| DL-try (percent) | — | — | — | — | — | — | 0.015 | — |
| Mean score | 1.6 | — | 2.4 | 2.1 | 2.1 | 1.9 | 2.0 | — |
| F-ratio | ** | | ** | ** | ** | ** | ** | |

Example 6

In case of the adidtion of L-glu-Na and α-amino acids to foods containing 5'-nucleotides in the natural substance.

or more kinds of α-amino acids is used, the effect occurs as algebraic sum of the activation. Accordingly a mixing ratio of α-amino acids to 5'-nucleotides of 0.05–50 is more effective.

The mixture ratio of the palatable 5'-nucleotides to L-glutamic acid is appropriate in the scope of 0.05–2.0 calculating to pure free form.

What we claim is:

1. A process for improving and increasing the taste of a solid seasoning, which consists essentially of adding glycine to a seasoning consisting essentially of a palatable 5'-nucleotide and L-glutamic acid or monosodium glutamate, the weight ratio of glycine to the palatable 5'-nucleotide being 3–20:1 as calculated as the pure free form.

2. A process for improving and increasing the taste of a solid seasoning, which consists essentially of adding L-analine to a seasoning consisting essentially of a palatable 5'-nucleotide and L-glutamic acid or monosodium glutamate, the weight ratio of L-alanine to the palatable 5'-nucleotide being 2–20:1 as calculated as the pure free form.

3. A process for improving and increasing the taste of a solid seasoning, which consists essentially of adding L-serine to a seasoning consisting essentially of a palatable 5'-nucleotide and L-glutamic acid or monosodium glutamate. the weight ratio of L-serine to the palatable 5'-nucleotide being 1–5:1 as calculated as the pure free form.

4. A process for improving and increasing the taste of a solid seasoning, which consists essentially of adding DL-tryptophan to a seasoning consisting essentially of a palatable 5-nucleotide and L-glutamic acid or monosodium glutamate, the weight ratio of DL-tryptophan to the palatable 5'-nucleotide being 0.05–20:1 as calculated as the pure free form.

5. A process for improving and increasing the taste of a solid seasoning, which consists essentially of adding L-histidine-HCl to a seasoning consisting essentially of a palatable 5'-nucleotide and L-glutamic acid or monosodium glutamate, the weight ratio of L-histidine-HCl to the palatable 5'-nucleotide being 0.02–1:1 as calculated as the pure free form.

6. A process for improving and increasing the taste of a solid seasoning, which consists essentially of adding L-methionine to a seasoning consisting essentially of a palatable 5'-nucleotide and L-glutamic acid or monosodium glutamate, the weight ratio of L-methionine to the palatable 5'-nucleotide being 0.05–20:1 as calculated as the pure free form.

7. A process for improving and increasing the taste of a solid seasoning, which consists essentially of adding at least two α-amino acids selected from the group consisting of glycine, L-alanine, L-serine, DL-tryptophan, L-histidine-HCl and L-methionine to a seasoning consisting essentially of a palatable 5'-nucleotide and L-glutamic acid or monosodium glutamate, the weight ratio of the α-amino acids to the palatable 5'-nucleotide being 0.05–50:1.

References Cited

UNITED STATES PATENTS

| | | | |
|---|---|---|---|
| 3,104,171 | 9/1963 | Sakaguchi et al. | 99—140 |
| 3,109,741 | 11/1963 | Toi et al. | 99—140 |
| 3,365,306 | 1/1968 | Perret | 99—140 |

OTHER REFERENCES

Kuninaka et al.: "History and Development of Flavor Nucleotides," Food Technology, 1964 (March), pp. 29–35.

A. LOUIS MONACELL, Primary Examiner

W. BOVEE, Assistant Examiner

UNITED STATES PATENT OFFICE
CERTIFICATE OF CORRECTION

Patent No. 3,573,066            Dated March 30, 1971

Inventor(s) Tamotsu Yokotsuka, Nobuo Saito, Akira Okuhaka and Teruo Tanaka

It is certified that error appears in the above-identified patent and that said Letters Patent are hereby corrected as shown below:

In the heading, correct the first priority application from "41/70186" to -- 39/70186 --.

Signed and sealed this 2nd day of November 1971.

(SEAL)
Attest:

EDWARD M. FLETCHER, JR.          ROBERT GOTTSCHALK
Attesting Officer                   Acting Commissioner of Pat